US012502327B2

(12) United States Patent
Dimitrelos et al.

(10) Patent No.: US 12,502,327 B2
(45) Date of Patent: Dec. 23, 2025

(54) BED STRETCHING SYSTEM

(71) Applicant: Moats Corporation, Plantation, FL (US)

(72) Inventors: Geronimos Dimitrelos, Plantation, FL (US); Amy Lopez, Davie, FL (US)

(73) Assignee: Moats Corporation, Plantation, FL (US)

( * ) Notice: Subject to any disclaimer, the term of this patent is extended or adjusted under 35 U.S.C. 154(b) by 571 days.

(21) Appl. No.: 17/868,344

(22) Filed: Jul. 19, 2022

(65) Prior Publication Data

US 2024/0024186 A1 Jan. 25, 2024

(51) Int. Cl.
*A61H 1/02* (2006.01)
*A47C 21/00* (2006.01)

(52) U.S. Cl.
CPC ........... *A61H 1/0218* (2013.01); *A47C 21/00* (2013.01); *A61H 2201/0146* (2013.01)

(58) Field of Classification Search
CPC ................. A61G 7/0536; A61G 7/053; A63B 21/00189; A63B 21/04; A63B 21/0407; A63B 21/0414; A63B 21/0552; A63B 21/0557; A63B 21/1672; A63B 2023/006; A61H 1/0218; A61H 2201/0146; A61H 1/02; A41C 21/00; A41C 15/008; A41C 21/02; A41C 21/022; A41C 21/028; A47C 31/08; A45C 2013/303; A47G 9/0292; B65D 63/18
USPC .......................................................... 294/152
See application file for complete search history.

(56) References Cited

U.S. PATENT DOCUMENTS

| | | | | | |
|---|---|---|---|---|---|
| 618,333 | A * | 1/1899 | Colteryahn | A45F 5/10 294/157 |
| 1,746,111 | A | 2/1930 | Fisher | |
| 2,923,014 | A * | 2/1960 | Hume | A47C 21/022 297/228.11 |
| 3,092,848 | A * | 6/1963 | Gronvold | A47C 21/022 24/72.5 |
| D254,217 | S * | 2/1980 | Corrigan | D3/315 |

(Continued)

FOREIGN PATENT DOCUMENTS

| | | | |
|---|---|---|---|
| CN | 108078662 | A | 5/2018 |
| KR | 20210119249 | A | 10/2021 |

OTHER PUBLICATIONS

Examiner search history—IP.com (Year: 2025).*

(Continued)

*Primary Examiner* — David R Hare
*Assistant Examiner* — Amanda L Bailey
(74) *Attorney, Agent, or Firm* — Akerman LLP

(57) ABSTRACT

According to one example, a bed stretching system includes a first corner connector that has a first connecting strap, a second connecting strap, a corner top strap, and a corner bottom strap. The first connecting strap and the second connecting strap may be positioned at least partially along a periphery of a mattress of a bed. The corner top strap may be positioned at least partially along a top side of the mattress. The corner bottom strap may be positioned at least partially along a bottom side of the mattress. The corner top strap and the corner bottom strap define a first opening that may receive a portion of a first corner of the mattress. The first connecting strap has a loop fastener and the second connecting strap has a hook fastener, or vice versa.

15 Claims, 5 Drawing Sheets

(56) References Cited

U.S. PATENT DOCUMENTS

| | | | | | |
|---|---|---|---|---|---|
| 4,553,780 | A * | 11/1985 | Strachan | A47C 31/08 | 294/149 |
| 4,611,804 | A * | 9/1986 | Addair | A63B 21/16 | 482/131 |
| 5,160,306 | A * | 11/1992 | Lui | A63B 23/0211 | 482/904 |
| 5,263,212 | A * | 11/1993 | Garcia | A47G 9/0246 | 5/498 |
| 5,375,280 | A | 12/1994 | O'Sullivan et al. | | |
| 5,701,620 | A * | 12/1997 | Montross | A47C 27/001 | 5/661 |
| 5,833,292 | A | 11/1998 | Lyons, Jr. | | |
| 5,927,781 | A * | 7/1999 | Lyons, Jr. | A45F 3/14 | 294/157 |
| 6,193,293 | B1 * | 2/2001 | Ybanez | B65G 7/12 | 294/157 |
| 6,834,651 | B1 | 12/2004 | Murdock et al. | | |
| 7,883,453 | B1 | 2/2011 | Cooper | | |
| 8,099,809 | B2 | 1/2012 | Tanaka et al. | | |
| 8,162,809 | B1 | 4/2012 | Eastwood | | |
| 9,282,829 | B2 | 3/2016 | Caruso et al. | | |
| 9,901,502 | B2 | 2/2018 | Rosario, Jr. et al. | | |
| 10,842,696 | B1 | 11/2020 | Wolpe | | |
| 2012/0071305 | A1 | 3/2012 | Berkoff | | |
| 2013/0074270 | A1 * | 3/2013 | Caruso | A63B 21/4021 | 5/658 |
| 2020/0015597 | A1 * | 1/2020 | Guy | A47C 21/022 | |
| 2020/0397163 | A1 * | 12/2020 | Wootten, Jr. | A47G 9/0246 | |
| 2021/0100707 | A1 * | 4/2021 | Wolpe | A63B 21/4043 | |
| 2021/0370127 | A1 | 12/2021 | Konopacz et al. | | |

OTHER PUBLICATIONS

"What Are Mattress Toppers and Mattress Protectors", Vision Linens, Feb. 7, 2020, https://web.archive.org/web/20201001034839/https://www.visionlinens.com/blog/what-is-mattress-topper-mattress-protector (Year: 2020).*

IP.com search (Year: 2025).*

BedGym: Stop Dreaming Get The Body You Want!, www.bedgym.com/ (Mar. 12, 2015).

Bed Sit-ups abdominal Exercise Equipment, www.heryogastore.com/ (Accessed Mar. 10, 2022).

FunCee Bed Ladder Assist Strap with 5 Hand Grips, Pull Up&Sit Up Handle Rope Ladder, Caddie Helper for Elderly, Senior, Injury Recovery, Patient, Pregnant, Handicapped with limited upper-body strength, www.amazon.com/ (Nov. 12, 2019).

RMS Dual Bed Rail—Adjustable Height Bed Assist Rail, Bed Side Hand Rail—FitsFull & Twin Beds (Dual Hand Rail), www.amazon.com/ (Sep. 23, 2016).

* cited by examiner

BED STRETCHING SYSTEM

TECHNICAL FIELD

This disclosure relates generally to the field of stretching/physical therapy and more specifically to a bed stretching system.

BACKGROUND

Sleep is extremely important. Furthermore, the quality of sleep is arguably more important than the quantity. To help with sleep, some people conduct various stretching exercises prior to going to sleep, or in the middle of the night. These stretching exercises are traditionally conducted either outside of the person's bed or while the person is in their bed. Traditional stretching devices and methods, however, may be deficient.

SUMMARY

According to a first example, a bed stretching system includes a first corner connector that has a first connecting strap, a second connecting strap, a first corner top strap, and a first corner bottom strap. The first connecting strap is configured to be positioned at least partially along a periphery of a mattress of a bed. The second connecting strap is configured to be positioned at least partially along the periphery of the mattress. The first corner top strap is configured to be positioned at least partially along a top side of the mattress, and has a first end coupled (e.g., connected) to the first connecting strap and a second end coupled to the second connecting strap. The first corner bottom strap is configured to be positioned at least partially along a bottom side of the mattress, and has a first end coupled to the first connecting strap and a second end coupled to the second connecting strap. The first corner top strap and the first corner bottom strap define a first opening that is configured to receive a portion of a first corner of the mattress. The first connecting strap has a loop fastener and the second connecting strap has a hook fastener, or vice versa. In some examples, the bed stretching system further includes a second corner connector, a third corner connector, and/or a fourth corner connector.

According to a second example, a method includes coupling a first end of a first corner top strap to a first connecting strap, coupling a second end of the first corner top strap to a second connecting strap, coupling a first end of a first corner bottom strap to the first connecting strap, and coupling a second end of the first corner bottom strap to the second connecting strap. The first connecting strap is configured to be positioned at least partially along a periphery of a mattress of a bed. The second connecting strap is configured to be positioned at least partially along the periphery of the mattress. The first corner top strap is configured to be positioned at least partially along a top side of the mattress. The first corner bottom strap configured to be positioned at least partially along a bottom side of the mattress. The first corner top strap and the first corner bottom strap define a first opening that is configured to receive a portion of a first corner of the mattress. The first connecting strap has a loop fastener and the second connecting strap has a hook fastener, or vice versa.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Figures 1A, 1B:
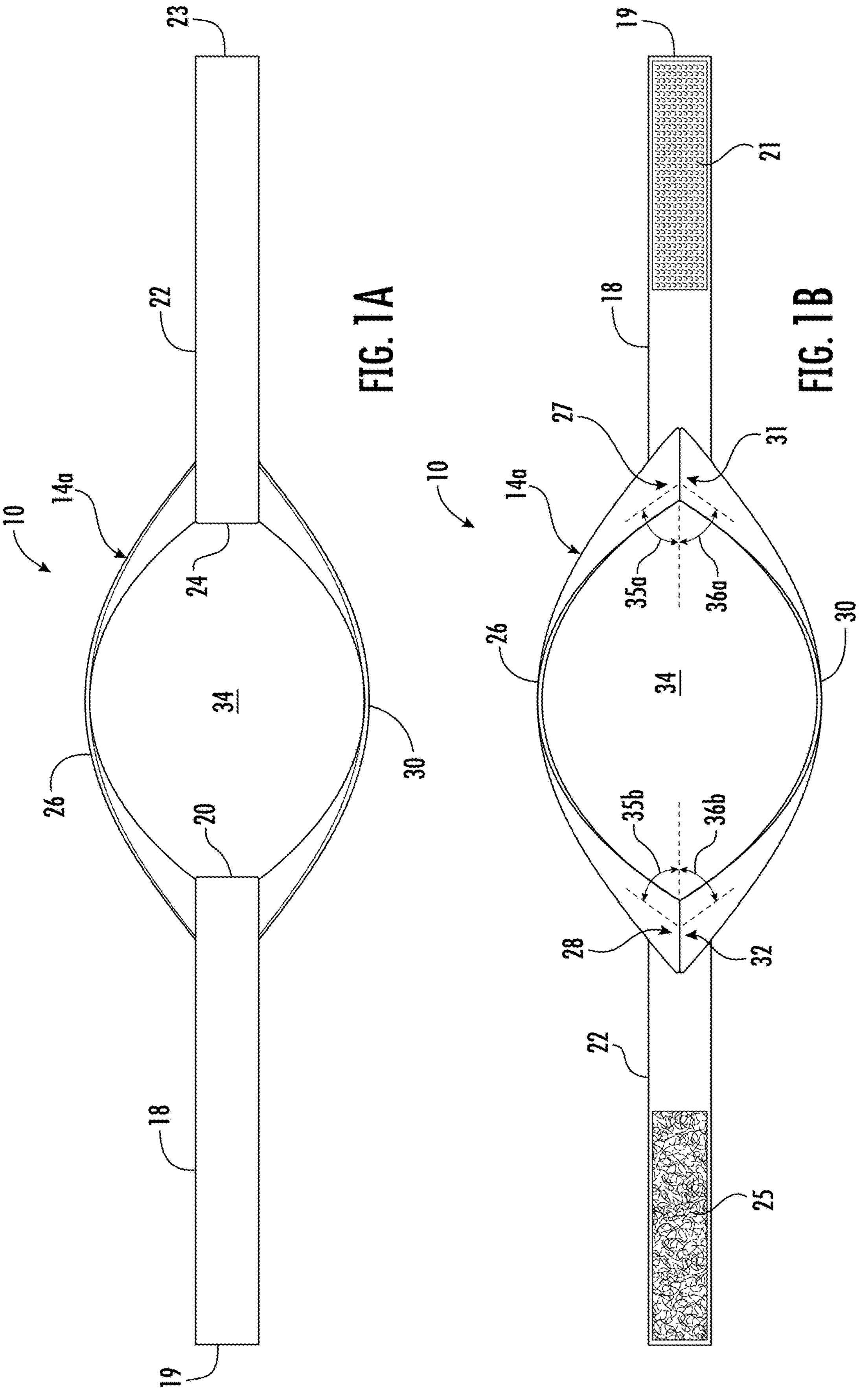
FIG. 1A is a front view of an example corner connector of a bed stretching system.
FIG. 1B is a back view of the corner connector of FIG. 1A.

Embodiments of the present disclosure are best understood by referring to FIGS. 1A-3 of the drawings, like numerals being used for like and corresponding parts of the various drawings.

To help with sleep, some people conduct various stretching exercises prior to going to sleep, or in the middle of the night. These stretching exercises are traditionally conducted either outside of the person's bed or while the person is in their bed. Traditional stretching devices and methods, however, may be deficient. For example, some people may forget to stretch before getting into bed. In such an example, the person may have to get out of bed in order to stretch (which may be inconvenient, and may result in the person not stretching at all), or the person may attempt to stretch while still in bed (which may not allow for a deep enough stretch). Similar problems may occur if the person wakes up in the middle of night (e.g., from a cramp, from tightness from a previous workout, from tightness from sitting at a computer desk for too long) and wants to stretch to help them fall back asleep. In such an example, the person may also have to get out of bed or may have to settle for a less deep stretch while remaining in bed, both of which may be undesirable.

FIGS. 1A-3 illustrate examples of a bed stretching system 10 that may address one or more of these deficiencies. In the example illustrated in FIGS. 1A-3, the bed stretching system 10 includes four corner connectors 14 (e.g., 14*a*, 14*b*, 14*c*, and 14*d*) that are positioned on a mattress 42 of a bed 54 so to allow a user (e.g., a man, woman, child, or any other user) to stretch while positioned on the bed 54. As illustrated, each corner connector 14 includes a first connecting strap 18, a second connecting strap 22, a corner top strap 26, and a corner bottom strap 30. Furthermore, the corner top strap 26 and the corner bottom strap 30 define an opening 34 in the corner connector 14. In operation, each corner connector 14 may be positioned on the mattress 42 so that a corner 46 of the mattress 42 is positioned within the opening 34 of the corner connector 14. This positioning may cause the corner top strap 26 to be positioned at least partially along a top side 48 of the mattress 42, and may further cause the corner bottom strap 30 to be positioned at least partially along a bottom side 50 of the mattress 42. Additionally, each corner connector 14 may be coupled (e.g., connected) to two other corner connectors 14 (via the first connecting straps 18 and the second connecting straps 22), so as to surround all (or a portion) of the periphery 52 of the mattress 42.

Figure 2A:
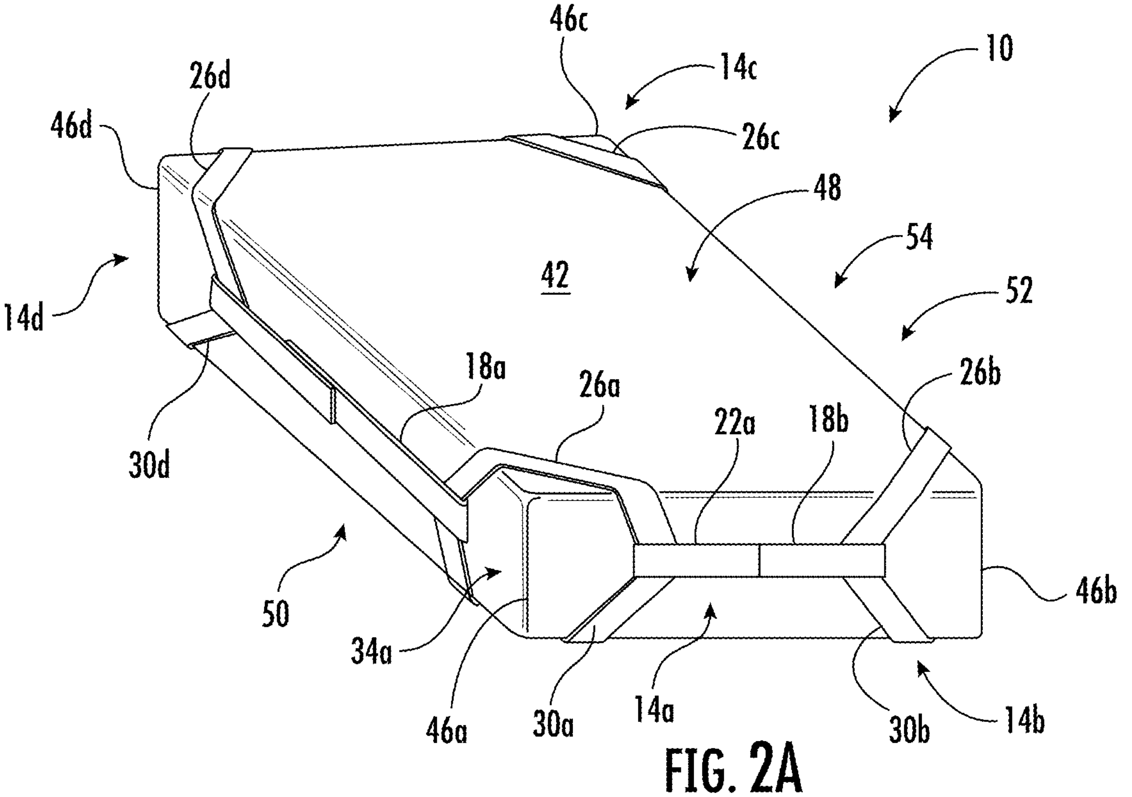
FIG. 2A is perspective view of an example bed stretching system installed on a mattress of a bed.
Figure 2B:
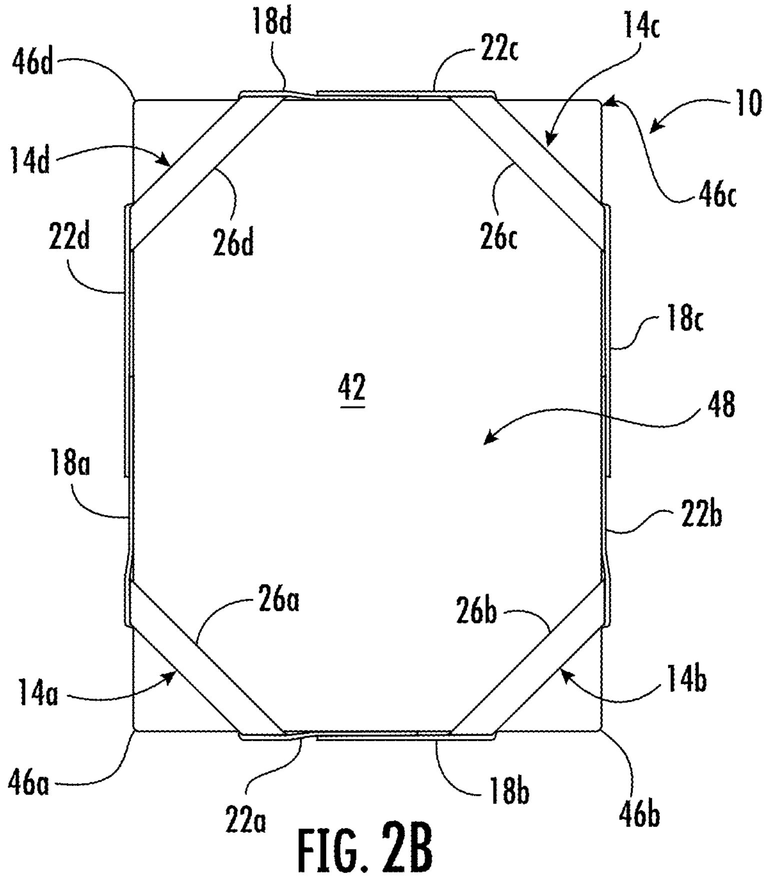
FIG. 2B is a top view of the example bed stretching system of FIG. 2A installed on the mattress of the bed.
Figure 2C:
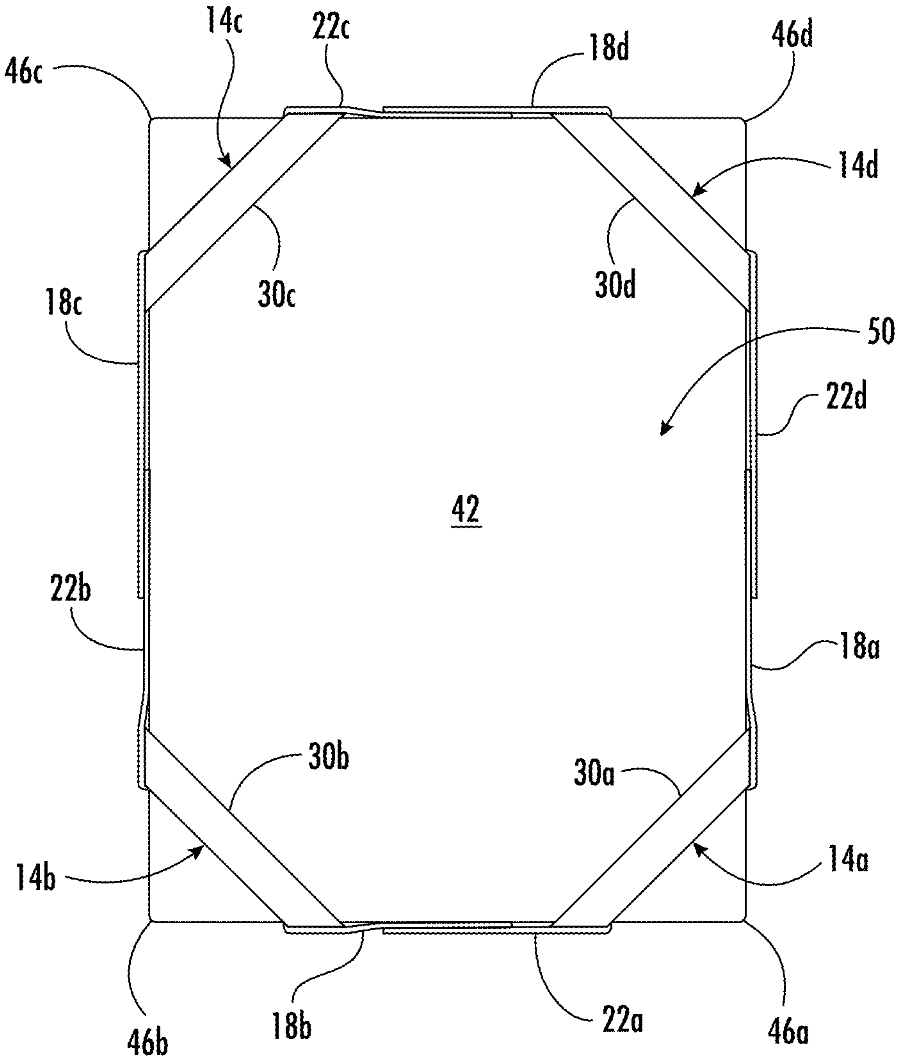
FIG. 2C is a bottom view of the example bed stretching system of FIG. 2A installed on the mattress of the bed.

When the bed stretching system 10 is installed on the mattress 42 (as is illustrated in FIGS. 2A-2C), the corner top straps 26 and the corner bottom straps 30 may hold the bed stretching system 10 in position on the mattress 42. For example, the corner top straps 26 may be positioned at least partially along the top side 48 of the mattress 42, and the corner bottom straps 30 may be positioned at least partially along the bottom side 50 of the mattress 42, which may prevent the bed stretching system 10 from shifting upward in relation to the mattress 42, shifting downward in relation to the mattress 42, and/or shifting side to side in relation to the mattress 42. Additionally, the corner top straps 26 of the bed stretching system 10 may be utilized by a user to perform stretches on the mattress 42. For example, a user may position a limb (or another portion of their body) underneath the corner top strap 26. Then, as the user stretches, the corner top strap 26 may provide resistance to that stretch, allowing for a deeper stretch, in some examples. Furthermore, in some examples, a user may attach one or more stretching bands 58 to the corner top straps 26, and then the user may utilize these stretching bands 58 to stretch, allowing for a deeper stretch, in some examples.

Figure 1C:
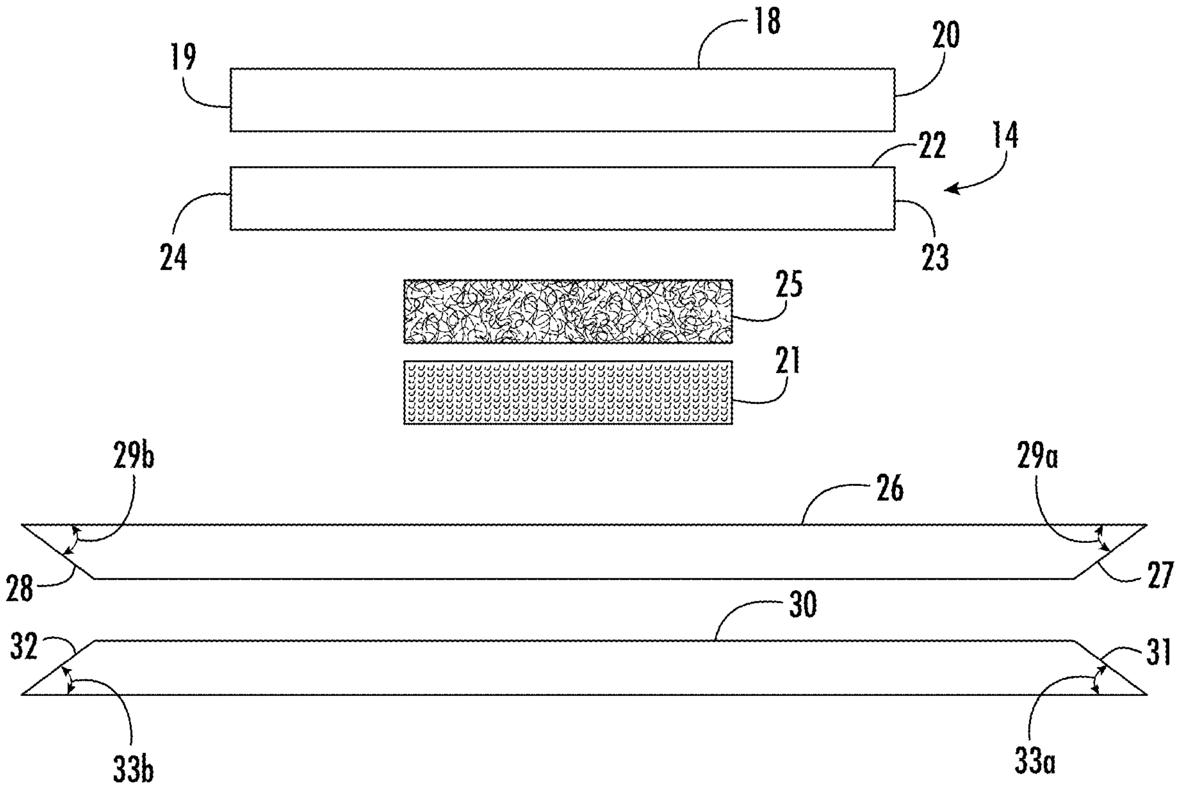
FIG. 1C is a deconstructed view of one example of the components of the corner connector of FIG. 1A.

FIGS. 1A-1C illustrate one example of a corner connector 14 of the bed stretching system 10. FIG. 1A is a front view of the example corner connector 14, FIG. 1B is a back view of the example corner connector 14, and FIG. 1C is a deconstructed view of the example corner connector 14.

As is illustrated in FIGS. 1A-1C, the corner connector 14 of the bed stretching system includes the first connecting strap 18, the second connecting strap 22, the corner top strap 26, and the corner bottom strap 30.

The first connecting strap 18 refers to an object that may be used to connect a corner connector 14 to another corner connector 14. The first connecting strap 18 may be any type of object, such as a strap, a belt, a line, any other object may be used to connect a corner connector 14 to another corner connector 14, or any combination of the preceding. In the illustrated example, the first connecting strap 18 is a strap.

The first connecting strap 18 is configured to be positioned at least partially along the periphery 52 of the mattress 42 of the bed 54, examples of which are illustrated in FIGS. 2A-2C. This may allow one or more corner connectors 14 (e.g., 4 corner connectors 14*a*-14*d*) to be coupled together so as to surround all or a portion of the periphery 52 of the mattress 42. In some examples, this connects the bed stretching system 10 to the mattress 42, which may prevent excessive movement of the bed stretching system 10 in relation to the mattress 42.

The first connecting strap 18 may be made of any material. For example, the first connecting strap 18 may be made of fabric, leather, webbing, elastic webbing, a rubber, a polymer, any other material that may be used to connect a corner connector 14 to another corner connector 14, or any combination of the preceding. In the illustrated example, the first connecting strap 18 is made of elastic webbing.

The first connecting strap 18 may have any shape. In the illustrated example, the first connecting strap 18 is rectangular. In some examples, the first connecting strap 18 may be a solid shape (e.g., no visible holes or gaps). In other examples, the first connecting straps 18 may include one or more visible holes or gaps.

The first connecting strap 18 may further have any size. For example, the first connecting strap 18 may have a length between a first end 19 and a second end 20 of 18-24 inches, such as, for example, 21 inches. In other examples, the first connecting strap 18 may have any other length. Additionally, the length of the first connecting strap 18 may be adjustable. For example, the first connecting strap 18 may be made of a flexible material that allows the length of the first connecting strap 18 to stretch and contract. In other examples, the first connecting strap 18 may be an adjustable strap that allows a user to change the useable length of the first connecting strap 18. These examples may allow the first connecting strap 18 to be adjusted to fit different sized mattresses 42 (e.g., Twin, Full, Queen, king, California King).

As is discussed above, the first connecting strap 18 may be used to connect a corner connector 14 to another corner connector 14 (e.g., connect corner connector 14*a* to corner connector 14*d*). To do so, the first connecting strap 18 may include a coupler 21 that allows the first connecting strap 18 to be detachably coupled to another connecting strap 18/22 of another corner connector 14. The coupler 21 may be any type of coupling apparatus. For example, the coupler 21 may be a hook and loop fastener (e.g., VELCRO strip) that can be detachably coupled to a respective hook and loop fastener (or other material). In other examples, the coupler 21 may be a buckle (e.g., a side release buckle, a top release buckle, a magnetic buckle), one or more snap buttons, a zip fastener (e.g., a zipper), additional material or length (which allows two connecting straps 18/22 to be tied together), a carabiner, any other type of coupler, or any combination of the preceding. In the illustrated example, the coupler 21 is a hook fastener (e.g., a hook fastener strip with a length of, for example, 12 inches) which may be detachably coupled to a loop fastener (or vice versa) included on another connecting strap 18/22 of another corner connector 14. In the illustrated example, the coupler 21 is coupled to and faces outward from a back side of the first connecting strap 18 (as is illustrated in FIG. 1B). In other examples, the coupler 21 may be coupled to and face outward from a front side of the first connecting strap 18.

The second connecting strap 22 refers to an object that may be used to connect a corner connector 14 to another corner connector 14. The second connecting strap 22 may be any type of object, such as a strap, a belt, a line, any other object may be used to connect a corner connector 14 to another corner connector 14, or any combination of the preceding. In the illustrated example, the second connecting strap 22 is a strap.

The second connecting strap 22 is configured to be positioned at least partially along the periphery 52 of the mattress 42 of the bed 54, examples of which are illustrated in FIGS. 2A-2C. This may allow one or more corner connectors 14 (e.g., 4 corner connectors 14*a*-14*d*) to be coupled together so as to surround all or a portion of the periphery 52 of the mattress 42. In some examples, this connects the bed stretching system 10 to the mattress 42, which may prevent excessive movement of the bed stretching system 10 in relation to the mattress 42.

The second connecting strap 22 may be made of any material. For example, the second connecting strap 22 may be made of fabric, leather, webbing, elastic webbing, a rubber, a polymer, any other material that may be used to connect a corner connector 14 to another corner connector 14, or any combination of the preceding. In the illustrated example, the second connecting strap 22 is made of elastic webbing.

The second connecting strap 22 may have any shape. In the illustrated example, the second connecting strap 22 is rectangular. In some examples, the second connecting strap 22 may be a solid shape (e.g., no visible holes or gaps). In other examples, the first connecting straps 18 may include one or more visible holes or gaps.

The second connecting strap 22 may further have any size. For example, the second connecting strap 22 may have a length between a first end 23 and a second end 24 of 18-24 inches, such as, for example, 21 inches. In other examples, the second connecting strap 22 may have any other length. Additionally, the length of the second connecting strap 22 may be adjustable. For example, the second connecting strap 22 may be made of a flexible material that allows the length of the second connecting strap 22 to stretch and contract. In other examples, the second connecting strap 22 may be an adjustable strap that allows a user to change the useable length of the second connecting strap 22. These examples may allow the second connecting strap 22 to be adjusted to fit different sized mattresses 42 (e.g., Twin, Full, Queen, King, California King).

As is discussed above, the second connecting strap 22 may be used to connect a corner connector 14 to another corner connector 14 (e.g., connect corner connector 14*a* to corner connector 14*b*). To do so, the second connecting strap 22 may include a coupler 25 that allows the second connecting strap 22 to be detachably coupled to another connecting strap 18/22 of another corner connector 14. The coupler 25 may be any type of coupling apparatus. For example, the coupler 25 may be a hook and loop fastener (e.g., VELCRO strip) that may be detachably coupled to a respective hook and loop fastener (or other material). In other examples, the coupler 25 may be a buckle (e.g., a side release buckle, a top release buckle, a magnetic buckle), one or more snap buttons, a zip fastener (e.g., a zipper), additional material or length (which allows two connecting straps 18/22 to be tied together), a carabiner, any other type of coupler, or any combination of the preceding. In the illustrated example, the coupler 25 is a loop fastener (e.g., a loop fastener strip with a length of, for example, 12 inches) which may be detachably coupled to a loop fastener (or vice versa) included on another connecting strap 18/22 of another corner connector 14. In the illustrated example, the coupler 25 is coupled to and faces outward from a back side of the second connecting strap 22 (as is illustrated in FIG. 1B). In other examples, the coupler 25 may be coupled to and face outward from a front side of the second connecting strap 22. Additionally, although FIG. 1B illustrates both the coupler 21 and the coupler 25 being coupled to and facing outward from the back side of the first connecting strap 21 and the second connecting strap 22, respectively, in some examples, one of the couplers 21/25 may be coupled to the front side and the other coupler 21/25 may be coupled to the back side.

The corner top strap 26 refers to an object that may be connected to both the first connecting strap 18 and the second connecting strap 22 in a manner that allows the corner top strap 26 to be positioned at least partially along a top side 48 of the mattress 42. The corner top strap 26 may be any type of object, such as a strap, a belt, a line, any other object that may be connected to both the first connecting strap 18 and the second connecting strap 22 in a manner that allows the corner top strap 26 to be positioned at least partially along a top side 48 of the mattress 42, or any combination of the preceding. In the illustrated example, the corner top strap 26 is a strap.

The corner top strap 26 is configured to be positioned at least partially along a top side 48 of the mattress 42, examples of which are illustrated in FIGS. 2A-2C. For example, when corner connector 14 is positioned on the mattress 42 (as is illustrated in FIGS. 2A-2C), the corner top strap 26 may extend vertically upward above the periphery 52 of the mattress 42 (from the first connecting strap 18), may further extend along a portion of the top side 48 of the mattress 42, and may the extend vertically downward back to the periphery 52 of the mattress 42 (to the second connecting strap 22). In some examples, by being positioned at least partially along the top side 48 of the mattress 48, the corner top strap 26 may help prevent excessive movement of the bed stretching system 10 in relation to the mattress 42. For example, the corner top strap 26 may help prevent the bed stretching system 10 from shifting downward in relation to the mattress 42.

In some examples, the corner top strap 26 may be configured to press tightly against the top side 48 of the mattress 42. This may allow the corner top strap 26 to provide resistance if a user utilizes the corner top strap 26 to perform one or more stretches, in some examples. This may further allow the corner top strap 26 to help prevent excessive movement of the bed stretching system 10 in relation to the mattress 42. The corner top strap 26 may be configured in any manner to press tightly against the top side 48 of the mattress 42. For example, the corner top strap 26 may have a length between a first end 27 and a second end 28 that is smaller than a corresponding portion of the mattress 42, which may cause the corner top strap 26 to dig into (or otherwise) press into the mattress 42. In another example, the length of the corner top strap 26 may be adjustable, allowing a user to shorten the length of the corner top strap 26 to cause it to dig into (or otherwise) press into the mattress 42.

The corner top strap 26 may be made of any material. For example, the corner top strap 26 may be made of fabric, leather, webbing, elastic webbing, a rubber, a polymer, any other material that may be connected to both the first connecting strap 18 and the second connecting strap 22, or any combination of the preceding. In the illustrated example, the corner top strap 26 is made of elastic webbing.

The corner top strap 26 may have any shape. In the illustrated example, the corner top strap 26 is shaped as a quadrilateral polygon. In some examples, the first end 27 and the second end 28 of the corner top strap 26 are not orthogonal to the sides of the corner top strap 26, as is illustrated in FIG. 1C. For example, the corner top strap 26 may have an angle 29*a* between the first end 27 and a side of the corner top strap 26 (and an angle 29*b* between the second end 28 and a side of the corner top strap 26) of 40-50 degrees, such as, for example, 45 degrees. In some examples, the corner top strap 26 may be a solid shape (e.g., no visible holes or gaps). In other examples, the corner top strap 26 may include one or more visible holes or gaps.

The corner top strap 26 may further have any size. For example, the corner top strap 26 may have a length (between the first end 27 and the second end 28) of 30-36 inches, such as, for example, 33 inches. In other examples, the corner top strap 26 may have any other length. Additionally, the length of the corner top strap 26 may be adjustable. For example, the corner top strap 26 may be made of a flexible material that allows the length of the corner top strap 26 to stretch and contract. In other examples, the corner top strap 26 may be an adjustable strap that allows a user to change the useable length of the corner top strap 26. These examples may allow the corner top strap 26 to be adjusted to fit different sized mattresses 54 (e.g., Twin, Full, Queen, King, California King).

As is discussed above, the corner top strap 26 may be connected to both the first connecting strap 18 and the second connecting strap 22 of the corner connector 14. For example, a first portion (e.g., the first end 27) of the corner top strap 26 may be connected to a first portion of the first connecting strap 18, and a second portion (e.g., the second end 28) of the corner top strap 26 may be connected to a first portion of the second connecting strap 22 (or vice versa). The corner top strap 26 may be connected (or otherwise coupled) to both the first connecting strap 18 and the second connecting strap 22 in any manner. For example, the corner top strap 26 may be stitched, glued, and/or ironed to the both the first connecting strap 18 and the second connecting strap 22. As other examples, the corner top strap 26 may be connected to the first connecting strap 18 and the second connecting strap 22 via one or more couplers, such a hook and loop fastener, a buckle (e.g., a side release buckle, a top release buckle, a magnetic buckle), one or more snap buttons, a zip fastener (e.g., a zipper), any other type of coupler, or any combination of the preceding. In a further example, the corner top strap 26 may be integrally formed with the first connecting strap 18, the second connecting strap 22, or both. As an example of this, the corner connector 14 may be formed (or otherwise created) as a single integral piece. In the illustrated example, the first portion (e.g., the first end 27) of the corner top strap 26 is connected to a first portion of the first connecting strap 18 via stitching, and the second portion (e.g., the second end 28) of the corner top strap 26 is also connected to the first portion of the second connecting strap 22 via stitching.

The corner top strap 26 may be connected at an angle 35 with respect to both the first connecting strap 18 and the second connecting strap 22 of the corner connector 14, as is illustrated in FIG. 1B. In some examples, the angle 35 (e.g., 35*a* and 35*b*) may be 40-50 degrees, such as, for example, 45 degrees. In some examples, the angle 35 may cause the first end 27 (which is angled at angle 29*a*) and the second end 28 (which is angled at 29*b*) to both be parallel with the first connecting strap 18 and the second connecting strap 22, as is seen in FIG. 1B.

The corner bottom strap 30 refers to an object that may be connected to both the first connecting strap 18 and the second connecting strap 22 in a manner that allows the corner bottom strap 30 to be positioned at least partially along a bottom side 50 of the mattress 42. The corner bottom strap 30 may be any type of object, such as a strap, a belt, a line, any other object that may be connected to both the first connecting strap 18 and the second connecting strap 22 in a manner that allows the corner bottom strap 30 to be positioned at least partially along a bottom side 50 of the mattress 42, or any combination of the preceding. In the illustrated example, the corner bottom strap 30 is a strap.

The corner bottom strap 30 is configured to be positioned at least partially along the bottom side 50 of the mattress 42, examples of which are illustrated in FIGS. 2A-2C. For example, when corner connector 14 is positioned on the mattress 42 (as is illustrated in FIGS. 2A-2C), the corner bottom strap 30 may extend vertically downward below the periphery 52 of the mattress 42 (from the first connecting strap 18), may further extend along a portion of the bottom side 50 of the mattress 42, and may further extend vertically upward back to the periphery 52 of the mattress 42 (to the second connecting strap 22). In some examples, by being positioned at least partially along the bottom side 50 of the mattress 42, the corner bottom strap may help prevent excessive movement of the bed stretching system 10 in relation to the mattress 42. For example, the corner bottom strap 30 may help prevent the bed stretching system from shifting upward in relation to the mattress 42.

In some examples, the corner bottom strap 30 may be configured to press tightly against the bottom side 50 of the mattress 42. This may allow the corner bottom strap 30 to help prevent excessive movement of the bed stretching system 10 in relation to the mattress 42. This may further increase the amount of resistance provided by the corner top strap 26, in some examples. The corner bottom strap 30 may be configured in any manner to press tightly against the bottom side 50 of the mattress 42. For example, the corner bottom strap 30 may have a length between a first end 31 and a second end 32 that is smaller than a corresponding portion of the mattress 42, which may cause the corner bottom strap 30 to dig into (or otherwise) press into the mattress 42. In another example, the length of the corner bottom strap 30 may be adjustable, allowing a user to shorten the length of the corner bottom strap 30 to cause it to dig into (or otherwise) press into the mattress 42.

The corner bottom strap 30 may be made of any material. For example, the corner bottom strap 30 may be made of fabric, leather, webbing, elastic webbing, a rubber, a polymer, any other material that may be connected to both the first connecting strap 18 and the second connecting strap 22, or any combination of the preceding. In the illustrated example, the corner bottom strap 30 is made of elastic webbing.

The corner bottom strap 30 may have any shape. In the illustrated example, the corner bottom strap 30 is shaped as a quadrilateral polygon. In some examples, the first end 31 and the second end 32 of the corner bottom strap 30 are not orthogonal to the sides of the corner bottom strap 30, as is illustrated in FIG. 1C. For example, the corner bottom strap 30 may have an angle 33*a* between the first end 31 and a side of the corner bottom strap 30 (and an angle 33*b* between the second end 32 and a side of the corner bottom strap 30) of 40-50 degrees, such as, for example, 45 degrees. In some examples, the corner bottom strap 30 may be a solid shape (e.g., no visible holes or gaps). In other examples, the corner bottom strap 30 may include one or more visible holes or gaps.

The corner bottom strap 30 may further have any size. For example, the corner bottom strap 30 may have a length (between the first end 31 and the second end 32) of 30-36 inches, such as, for example, 33 inches. In other examples, the corner bottom strap 30 may have any other length. Additionally, the length of the corner bottom strap 30 may be adjustable. For example, the corner bottom strap 30 may be made of a flexible material that allows the length of the corner bottom strap 30 to stretch and contract. In other examples, the corner bottom strap 30 may be an adjustable strap that allows a user to change the useable length of the corner bottom strap 30. These examples may allow the corner bottom strap 30 to be adjusted to fit different sized mattresses 42 (e.g., Twin, Full, Queen, King, California King).

As is discussed above, the corner bottom strap 30 may be connected to both the first connecting strap 18 and the second connecting strap 22 of the corner connector 14. For example, a first portion (e.g., the first end 31) of the corner bottom strap 30 may be connected to a first portion of the first connecting strap 18, and a second portion (e.g., the second end 32) of the corner bottom strap 30 may be connected to a first portion of the second connecting strap 22 (or vice versa). The corner bottom strap 30 may be connected to both the first connecting strap 18 and the second connecting strap 22 in any manner. For example, the corner bottom strap 30 may be stitched, glued, and/or ironed to the both the first connecting strap 18 and the second connecting strap 22. As other examples, the corner bottom strap 30 may be connected to the first connecting strap 18 and the second connecting strap 22 via one or more couplers, such a hook and loop fastener, a buckle (e.g., a side release buckle, a top release buckle, a magnetic buckle), one or more snap buttons, a zip fastener (e.g., a zipper), any other type of coupler, or any combination of the preceding. In a further example, the corner bottom strap 30 may be integrally formed with the first connecting strap 18, the second connecting strap 22, or both. As an example of this, the corner connector 14 may be formed (or otherwise created) as a single integral piece. In the illustrated example, the first portion (e.g., the first end 31) of the corner bottom strap 30 is connected to a first portion of the first connecting strap 18 via stitching, and the second portion (e.g., the second end 32) of the corner bottom strap 30 is also connected to a first portion of the second connecting strap 22 via stitching.

The corner bottom strap 30 may be connected at an angle 36 with respect to both the first connecting strap 18 and the second connecting strap 22 of the corner connector 14, as is illustrated in FIG. 1B. In some examples, the angle 36 (e.g., 36*a* and 36*b*) may be 40-50 degrees, such as, for example, 45 degrees. In some examples, the angle 36 may cause the first end 31 (which is angled at angle 33*a*) and the second end 32 (which is angled at 33*b*) to both be parallel with the first connecting strap 18 and the second connecting strap 22, as is seen in FIG. 1B.

In the illustrated examples, the corner top strap 26 and the corner bottom strap 30 define an opening 34 in the corner connector 14. This opening 34 may be configured to receive a portion of a corner 46 of the mattress 42, as is illustrated in FIGS. 2A-2B. For example, when the corner connector 14 is being positioned on the mattress 42, the corner top strap 26 and the corner bottom strap 30 may be slid (or otherwise positioned) over a corner 46 of the mattress 42, causing a portion of the corner 46 to be positioned within the opening 34. The opening 34 may be configured in any manner to receive a portion of a corner 46 of the mattress 42. For example, the opening 34 may be sized and/or shaped to allow a portion of the corner 46 to fit within the opening 34. Additionally, the size and/or shape of the opening 34 may be adjustable, so as to allow the portion of the corner 46 to better fit within the opening 34. As an example of this, the length of the corner top strap 26 and/or the corner bottom strap 30 may be adjustable (e.g., due to a flexible material, due to being adjustable straps, etc.), as is discussed above. This adjustability of the length of the corner top strap 26 and/or the corner bottom strap 30 may also adjust the size and/or shape of the opening 34.

In some examples, the opening 34 may be configured so that the corner top strap 26 and/or the corner bottom strap 30 press tightly against a portion of the corner 46 (e.g., press tightly against the corner 46 on the top side 48, the bottom side 50, and/or the periphery 52). This may allow the corner top strap 26 and/or the corner bottom strap 30 to help prevent excessive movement of the bed stretching system 10 in relation to the mattress 42. For example, it may help prevent the bed stretching system 10 from shifting upward in relation to the mattress 42, from shifting downward in relation to the mattress 42, and/or from shifting side to side in relation to the mattress 42. This may further increase the amount of resistance provided by the corner top strap 26, in some examples. The opening 34 may be configured in any manner so that the corner top strap 26 and/or the corner bottom strap 30 press tightly against a portion of the corner 46. Examples of this configuration are discussed above with regard to the configuration of the corner top strap 26 and/or the corner bottom strap 30.

Although the opening 34 is described above as being defined by the corner top strap 26 and the corner bottom strap 30, in some examples, the opening 34 may also further be defined by a portion (e.g., the second end 20) of the first connecting strap 18 and/or a portion (e.g., the second end 24) of the second connecting strap 20. For example, a portion of the first connecting strap 18 and/or the second connecting strap 20 may extend into the opening 34, causing the opening 34 to be further defined by the first connecting strap 18 and/or the second connecting strap 20 (in addition to being defined by the corner top strap 26 and the corner bottom strap 30).

As is discussed above, FIG. 1C is a deconstructed view of example components of the corner connector 14. In some examples, each of the components illustrated in FIG. 1C may be assembled together to form the corner connector 14 illustrated in FIGS. 1A and 1B. As one example of such an assembly: (1) a first portion (e.g., the first end 27) of the corner top strap 26 may be connected (e.g., via stitching) to the first connecting strap 18, and a second portion (e.g., the second end 28) of the corner top strap 26 may be connected (e.g., via stitching) to the second connecting strap 22 (or vice versa), where the connections may be at angles 35*a* and 35*b*; (2) a first portion (e.g., the first end 31) of the corner bottom strap 30 may be connected (e.g., via stitching) to the first connecting strap 18, and a second portion (e.g., the second end 32) of the corner bottom strap 30 may be connected (e.g., via stitching) to the second connecting strap 22 (or vice versa), where the connections may be at angles 36*a* and 36*b*; (3) the coupler 21 (e.g., a hook fastener) may be connected (e.g., via stitching) to the first connecting strap 18; and (4) the coupler 25 (e.g., a loop fastener) may be connected (e.g., via stitching) to the second connecting strap 22. This example assembly may be repeated any number of times to create the bed stretching system 10. For example, the assembly may be repeated four times to create four corner connectors 14, thereby creating one example of the bed stretching system 10.

FIGS. 2A-2C illustrate an example bed stretching system 10 installed on a mattress 42 of a bed 54. In particular, FIG. 2A is perspective view of the example bed stretching system 10 installed on the mattress 42 of the bed 54; FIG. 2B is a top view of the example bed stretching system 10 installed on the mattress 42 of the bed 54; and FIG. 2C is a bottom view of the example bed stretching system 10 installed on the mattress 42 of the bed 54.

In the illustrated example, the bed 54 includes the mattress 42. The mattress 42 may be a mattress of any size (e.g., Twin, Full, Queen, King, California King). The mattress 42 includes the top side 48 (which is the side that is currently positioned facing upward, so as to allow a user to lay on the top side 48), the bottom side 50 (which is the side that is currently facing downward), the periphery 52 (which is the sides that are currently facing horizontally), and four corners 46*a*-46*d*. In some examples, the bed 54 may include one or more additional structures and/or objects, such as a bed frame, a box spring, covers, bed sheets (e.g., bottom sheet, top sheet), mattress cover, mattress pad, pillows, any other structure and/or object, or any combination of the preceding.

As is illustrated in FIGS. 2A-2C, the bed stretching system 10 is installed on the mattress 42. As one example of such an installation: (1) each of the corner connectors 14*a*-14*d* are slid (or otherwise positioned) over a respective corner 46*a*-46*d* (which cause the respective corner 46 to be positioned within the opening 34 of the respective corner connector 14); and (2) each corner connector 14 is coupled to the two adjacent corner connectors 14 on either side. A corner connector 14 may be coupled to the two adjacent corner connectors 14 in any manner. For example, in the illustrated example, the first connection strap 18*a* of the corner connector 14*a* is coupled (e.g., via loop and hoop fasteners) to the second connection strap 22*d* of the corner connector 14*d*, and the second connection strap 22*a* of the corner connector 14*a* is coupled (e.g., via loop and hoop fasteners) to the first connection strap 18*b* of the corner connector 14*b*. In such an example, the remaining corner connectors 14*b*, 14*c*, and 14*d* are coupled in a similar manner. In some examples, the installation may involve alternating the direction that each corner connector 14*a*-14*d* faces. For example, corner connector 14*a* may be installed so the back view (FIG. 1B) faces outward away from mattress 42, corner connector 14*b* may be installed so that so the back view (FIG. 1B) faces inward toward the mattress 42, corner connector 14*c* may be installed so the back view (FIG. 1B) faces outward away from mattress 42, and corner connector 14*d* may be installed so that so the back view (FIG. 1B) faces inward toward the mattress 42. In some examples, the installation may further involve adjusting the connections, and/or adjusting the lengths of the individual components of the corner connectors 14, so as to cause the corner connectors 14 to press tightly into the mattress 42.

In some examples, the bed stretching system 10 is not installed directly on the bare mattress 42. For example, it may be installed on the mattress 42 in a location over the bottom bed sheet (e.g., the fitted bed sheet), or over any of the other sheets of the bed 54. This may allow the bed stretching system 10 to be utilized while the bed 54 is made (and is set up for a user to sleep in). As such, a user may utilize the bed stretching system 10 after they get in the bed for the night, in the middle of the night (e.g., if they wake up), in the morning (e.g., before getting out of bed), or any other time that the user is in the bed. In other examples, the bed stretching system 10 is installed directly on a bare mattress 42.

In some examples, after the bed stretching system 10 in installed on the mattress 42 (an example of which is described above), the user may use the bed stretching system 10 to perform one or more stretches on the mattress 42. For example, a user may position a limb (or another portion of their body) underneath one of the corner top straps 26. Then, as the user stretches, the corner top strap 26 may provide resistance to that stretch, allowing for a deeper stretch, in some examples. As one example of this, the user may position the user's right arm underneath the corner top strap 26*d* of the corner connector 14*d*. Then, the user may stretch one or more muscles associated with the user's right arm, and the corner top strap 26*d* may provide resistance to that stretch, allowing for a deeper stretch, in some examples. The user may position any number of limbs (or other portions of their body) under corner top straps 26. For example, the user may position both their arms and both their legs under respective corner top straps 26. As another example, the user may position both their left arm and their left leg under respective corner top straps 26, or the user may position both their right arm and their right leg under respective corner top straps 26.

The user may utilize the bed stretching system 10 at any time of day or night. For example, the user may utilize the bed stretching system 10 after they get in the bed for the night, in the middle of the night (e.g., if they wake up), in the morning (e.g., before getting out of bed), or any other time that the user is in the bed. In some example, because the bed stretching system is positioned in a location over the bottom bed sheet (e.g., the fitted bed sheet) or over any of the other sheets of the bed 54, the bed stretching system 10 may be utilized while the bed 54 is made (and is set up for a user to sleep in). As such, the bed stretching system 10 may be more convenient for the user. For example, the user does not need to get out of the bed to stretch. As another example, the user can stretch in the middle of the night (e.g., if they wake up), without having to re-set up the bed stretching system 10. Instead, the user may only need to position a limb underneath a corner top strap 26 (which is located above the fitted bed sheet) in order to stretch. This may be done without the user removing covers from their body, in some examples, which may help the user fall back to sleep faster after the stretch.

Figure 3:
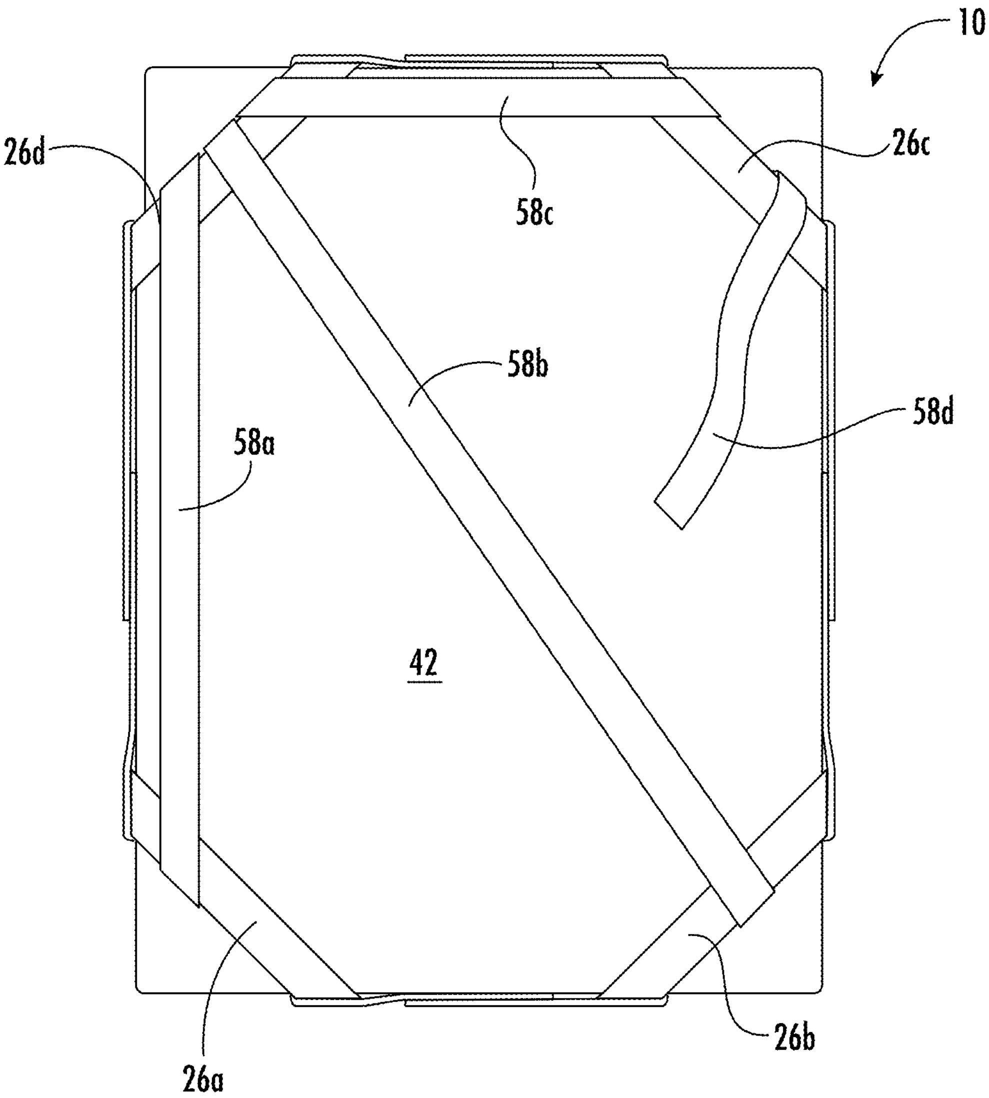
FIG. 3 is a top view of another example bed stretching system installed on a mattress of a bed.

FIG. 3 is a top view of another example bed stretching system 10 installed on the mattress 42 of the bed 54. In the example illustrated in FIG. 3, the bed stretching system 10 further includes one or more stretching bands 58 that may be utilized by a user to assist in stretching.

The stretching band 58 refers to an object that may be connected to one or more of the corner top straps 26, and that further may be used for stretching. The stretching band 58 may be any type of object, such as a band, strap, a belt, a line, any other object that may be connected to one or more of the corner top straps 26, and that further may be used for stretching, or any combination of the preceding. In some examples, the stretching band 58 may be a well-known stretching band that may be utilized with the bed stretching system 10. In the illustrated example, the stretching band 58 is a band that loops around one or more of the corner top straps 26.

The stretching band 58 is configured to be connected to one or more of the corner top straps 26. Examples of this connection are illustrated in FIG. 3. The stretching band 58 may be configured in any manner so as to be connected to one or more of the corner top straps 26. For example, the stretching band 58 may have a sufficient length to extend between two opposite corner top straps 26. As another example, the stretching band 58 may include one or more couplers (not shown) that allows the stretching band 58 to be detachably coupled to one or more of the corner top straps 26. Such a coupler may be a hook and loop fastener, a buckle (e.g., a side release buckle, a top release buckle, a magnetic buckle), one or more snap buttons, a zip fastener (e.g., a zipper), additional material or length (which allows two ends of the stretching band to be tied together), a carabiner, any other type of coupler, or any combination of the preceding.

The stretching band 58 may be connected to any of the corner top straps 26. For example, the stretching band 58 may be connected to the corner top strap 26*a*, 26*b*, 26*c*, and/or 26*d*. The stretching band 58 may be connected to any number of the corner top straps 26. For example, the stretching band 58 may be connected to two opposite corner top straps 26 (examples of which are illustrated as stretching band 58*a* connected to corner top straps 26*a* and 26*d*, stretching band 58*b* connected to corner top straps 26*b* and 26*d*, and stretching band 58*c* connected to corner top straps 26*c* and 26*d*). In such an example, the length of the stretching band 58 in-between the two opposite corner top straps 26 may be used for stretching (e.g., a person may position a portion of their body underneath the length of the stretching band 58 in order to stretch). As another example, the stretching band 58 may only be connected to a single corner top strap 26 (an example of which is illustrated as stretching band 58*d* connected to only corner top band 26*c*). In such an example, the stretching band 58 may have a loose end that may be used for stretching.

Although the stretching band 58 is illustrated as being connected to one or more of the corner top straps 26, in some examples, the stretching band 58 may be connected to any other portion of the corner connectors 14. For example, the stretching band 58 may be connected to the first connection strap 18, the second connection strap 22, the corner bottom strap 30, any other portion of the corner connector 14, or any combination of the preceding.

The stretching band 58 may be made of any material. For example, the stretching band 58 may be made of fabric, leather, webbing, elastic webbing, a rubber, a polymer, any other material that may be used for stretching, or any combination of the preceding. In the illustrated example, the stretching band 58 is made of elastic webbing (e.g., elastic webbing made of polyester and rubber latex thread).

The stretching band 58 may have any shape. In the illustrated example, the stretching band 58 is rectangular. For example, in the illustrated example, the stretching band 58 is a rectangular piece of material that is coupled together at its two ends, to form a continuous loop. In some examples, the stretching band 58 may be a solid shape (e.g., no visible holes or gaps). In other examples, the stretching band 58 may include one or more visible holes or gaps. The stretching band 58 may further have any size.

As one example of operation, after the stretching band(s) 58 are installed (examples of which are illustrated in FIG. 3), a user may position a limb (or another portion of their body) underneath one of the stretching bands 58 (or into a loop of the stretching band 58, or the user may hold on to the stretching band 58). Then, as the user stretches, the stretching band 58 may provide resistance to that stretch, allowing for a deeper stretch, in some examples. In some examples, the user may utilize the stretching band(s) 58 and/or the corner top strap(s) 26 to stretch. For example, the user may simultaneously utilize both the stretching band **58*a* and the corner top strap 26*c* to stretch a side of the user's body. In other examples, the user may utilize a stretching band 58 to stretch a first portion of their body, and then the user may subsequently utilize a corner top strap 26** to stretch a second portion of their body (or vice versa).

In some examples because the stretching bands 58 are positioned in a location over the bottom bed sheet (e.g., the fitted bed sheet) or over any of the other sheets of the bed 54, the stretching bands 58 (and/or the corner top straps 26) may be utilized while the bed 54 is made (and is set up for a user to sleep in). As such, the bed stretching system 10 may be more convenient for the user. For example, the user does not need to get out of the bed to stretch. As another example, the user can stretch in the middle of the night (e.g., if they wake up), without having to re-set up the bed stretching system 10. Instead, the user may only need to position a limb underneath a stretching band 58 and/or a corner top strap 26 (both of which are located above the fitted bed sheet) in order to stretch. This may be done without the user removing covers from their body, in some examples, which may help the user fall back to sleep faster after the stretch.

Modifications, additions, and/or substitutions may be made to the bed stretching system 10, the components of the bed stretching system 10, and/or the functions of the bed stretching system 10 without departing from the scope of the specification. For example, although the bed stretching system 10 is illustrated as including four corner connectors 14, the bed stretching system 10 may include any other number of corner connectors 14. For example, the bad stretching system 10 may include only a single corner connector 14, only two corner connectors 14, or only three corner connectors 14. In such examples, the length of the first and second connecting straps 18 and 22 may be increased (and/or additional straps may be used) to connect the corner connector(s) 14 to the mattress 42. As another example, although the bed stretching system 10 is illustrated in FIG. 3 as including four stretching bands 58, in some examples, stretching system 10 may include any other number of stretching bands 58, such as, for example, one stretching band 58, two stretching bands 58, or any other number. Furthermore, the stretching bands 58 may be positioned in any other configuration. As a further example, although the bed stretching system 10 is described as being used for stretching, in other examples the bed stretching system 10 may be used for any other purpose, such as exercising, physical therapy, any other activity, or any combination of the preceding.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed steps, components, elements, features, aspects, characteristics, limitations, and the like, of the various non-limiting and non-exhaustive examples described in this specification. In this manner, Applicant reserves the right to amend the claims during prosecution to add features as variously described in this specification.

What is claimed is:

1. A bed stretching system, comprising:

a first corner connector, comprising:

- a first connecting strap configured to be positioned at least partially along a periphery of a mattress of a bed, the first connecting strap comprising a first end of the first connecting strap, a second end of the first connecting strap, and a length between the first end of the first connecting strap and the second end of the first connecting strap;
- a second connecting strap configured to be positioned at least partially along the periphery of the mattress, the second connecting strap comprising a first end of the second connecting strap, a second end of the second connecting strap, and a length between the first end of the second connecting strap and the second end of the second connecting strap;
- a first corner top strap configured to be positioned at least partially along a top side of the mattress, the first corner top strap having a first end of the first corner top strap that is coupled to the first connecting strap, the first corner top strap further having a second end of the first corner top strap that is coupled to the second connecting strap;
- a first corner bottom strap configured to be positioned at least partially along a bottom side of the mattress, the first corner bottom strap having a first end of the first corner bottom strap that is coupled to the first connecting strap, the first corner bottom strap further having a second end of the first corner bottom strap that is coupled to the second connecting strap;
- wherein the first corner top strap, the first corner bottom strap, the second end of the first connecting strap, and the second end of the second connecting strap define a first opening in the first corner connector, the first opening configured to receive a portion of a first corner of the mattress;
- wherein the first connecting strap has a loop fastener and the second connecting strap has a hook fastener, or vice versa;

a second corner connector comprising:

a third connecting strap configured to be positioned at least partially along the periphery of the mattress, the third connecting strap comprising a first end of the third connecting strap, a second end of the third connecting strap, and a length between the first end of the third connecting strap and the second end of the third connecting strap;

a fourth connecting strap configured to be positioned at least partially along the periphery of the mattress, the fourth connecting strap comprising a first end of the fourth connecting strap, a second end of the fourth connecting strap, and a length between the first end of the fourth connecting strap and the second end of the fourth connecting strap;

a second corner top strap configured to be positioned at least partially along the top side of the mattress, the second corner top strap having a first end of the second corner top strap that is coupled to the third connecting strap, the second corner top strap further having a second end of the second corner top strap that is coupled to the fourth connecting strap;

a second corner bottom strap configured to be positioned at least partially along the bottom side of the mattress, the second corner bottom strap having a first end of the second corner bottom strap that is coupled to the third connecting strap, the second corner bottom strap further having a second end of the second corner bottom strap that is coupled to the fourth connecting strap;

wherein the second corner top strap, the second corner bottom strap, the second end of the third connecting strap, and the second end of the fourth connecting strap define a second opening in the second corner connector, the second opening configured to receive a portion of a second corner of the mattress; and wherein the third connecting strap has a loop fastener and the fourth connecting strap has a hook fastener, or vice versa.

2. The bed stretching system of claim 1, wherein the first connecting strap and the second connecting strap each have an adjustable length.

3. The bed stretching system of claim 1, further comprising a stretching band configured to be detachably coupled to the first corner top strap.

4. The bed stretching system of claim 1, wherein the first connecting strap, the second connecting strap, the first corner top strap, and the first corner bottom strap are each made of elastic webbing.

5. The bed stretching system of claim 1, wherein the first end of the first corner top strap is coupled to the first connecting strap by stitching, wherein the second end of the first corner top strap is coupled to the second connecting strap by stitching, wherein the first end of the first corner bottom strap is coupled to the first connecting strap by stitching, wherein the second end of the first corner bottom strap is coupled to the second connecting strap by stitching.

6. The bed stretching system of claim 1, wherein the first end of the first corner top strap is integrally formed with first connecting strap, wherein the second end of the first corner top strap is integrally formed with the second connecting strap, wherein the first end of the first corner bottom strap is integrally formed with the first connecting strap, wherein the second end of the first corner bottom strap is integrally formed with the second connecting strap.

7. The bed stretching system of claim 1, wherein the first end of the first corner top strap is coupled to the first connecting strap at an angle of 40-50 degrees, wherein the second end of the first corner top strap is coupled to the second connecting strap at an angle of 40-50 degrees, wherein the first end of the first corner bottom strap is coupled to the first connecting strap at an angle of 40-50 degrees, wherein the second end of the first corner bottom strap is coupled to the second connecting strap at an angle of 40-50 degrees.

8. A method comprising:

coupling a first end of a first corner top strap to a first connecting strap, the first connecting strap configured to be positioned at least partially along a periphery of a mattress of a bed, the first connecting strap comprising a first end of the first connecting strap, a second end of the first connecting strap, and a length between the first end of the first connecting strap and the second end of the first connecting strap, the first corner top strap configured to be positioned at least partially along a top side of the mattress;

coupling a second end of the first corner top strap to a second connecting strap, the second connecting strap configured to be positioned at least partially along the periphery of the mattress, the second connecting strap comprising a first end of the second connecting strap, a second end of the second connecting strap, and a length between the first end of the second connecting strap and the second end of the second connecting strap;

coupling a first end of a first corner bottom strap to the first connecting strap, the first corner bottom strap configured to be positioned at least partially along a bottom side of the mattress;

coupling a second end of the first corner bottom strap to the second connecting strap;

coupling a first end of a second corner top strap to a third connecting strap, the third connecting strap configured to be positioned at least partially along the periphery of the mattress, the third connecting strap comprising a first end of the third connecting strap, a second end of the third connecting strap, and a length between the first end of the third connecting strap and the second end of the third connecting strap, the second corner top strap configured to be positioned at least partially along the top side of the mattress;

coupling a second end of the second corner top strap to a fourth connecting strap, the fourth connecting strap configured to be positioned at least partially along the periphery of the mattress, the fourth connecting strap comprising a first end of the fourth connecting strap, a second end of the fourth connecting strap, and a length between the first end of the fourth connecting strap and the second end of the fourth connecting strap;

coupling a first end of a second corner bottom strap to the third connecting strap, the second corner bottom strap configured to be positioned at least partially along the bottom side of the mattress;

coupling a second end of the second corner bottom strap to the fourth connecting strap;

wherein the first corner top strap, the first corner bottom strap, the second end of the first connecting strap, and the second end of the second connecting strap define a first opening in a first corner connector, the first opening configured to receive a portion of a first corner of the mattress;

wherein the second corner top strap, the second corner bottom strap, the second end of the third connecting strap, and the second end of the fourth connecting strap define a second opening in a second corner connector, the second opening configured to receive a portion of a second corner of the mattress; and wherein the first connecting strap has a loop fastener and the second connecting strap has a hook fastener, or vice versa.

9. The method of claim 8, wherein the first connecting strap and the second connecting strap each have an adjustable length.

10. The method of claim 8, further comprising providing a stretching band configured to be detachably coupled to the first corner top strap.

11. The method of claim 8, wherein the first connecting strap, the second connecting strap, the first corner top strap, and the first corner bottom strap are each made of elastic webbing.

12. The method of claim 8, wherein:

coupling the first end of the first corner top strap to the first connecting strap comprises stitching the first end of the first corner top strap to the first connecting strap;

coupling the second end of the first corner top strap to the second connecting strap comprises stitching the second end of the first corner top strap to the second connecting strap;

coupling the first end of the first corner bottom strap to the first connecting strap comprises stitching the first end of the first corner bottom strap to the first connecting strap; and coupling the second end of the first corner bottom strap to the second connecting strap comprises stitching the second end of the first corner bottom strap to the second connecting strap.

13. The method of claim 8, wherein:

coupling the first end of the first corner top strap to the first connecting strap comprises integrally forming the first end of the first corner top strap with the first connecting strap;

coupling the second end of the first corner top strap to the second connecting strap comprises integrally forming the second end of the first corner top strap with the second connecting strap;

coupling the first end of the first corner bottom strap to the first connecting strap comprises integrally forming the first end of the first corner bottom strap with the first connecting strap; and coupling the second end of the first corner bottom strap to the second connecting strap comprises integrally forming the second end of the first corner bottom strap with the second connecting strap.

14. The method of claim 8, wherein:

coupling the first end of the first corner top strap to the first connecting strap comprises coupling the first end of the first corner top strap to the first connecting strap at an angle of 40-50 degrees;

coupling the second end of the first corner top strap to the second connecting strap comprises coupling the second end of the first corner top strap to the second connecting strap at an angle of 40-50 degrees;

coupling the first end of the first corner bottom strap to the first connecting strap comprises coupling the first end of the first corner bottom strap to the first connecting strap at an angle of 40-50 degrees; and coupling the second end of the first corner bottom strap to the second connecting strap comprises coupling the second end of the first corner bottom strap to the second connecting strap at an angle of 40-50 degrees.

15. The method of claim 8, further comprising:

coupling the loop fastener to the first connecting strap or the second connecting strap; and coupling the hook fastener to the second connecting strap or the first connecting strap.

* * * * *